United States Patent
Yoo et al.

(10) Patent No.: US 7,505,024 B2
(45) Date of Patent: Mar. 17, 2009

(54) BACKLIGHT UNIT IN DISPLAY DEVICE AND LIQUID CRYSTAL DISPLAY DEVICE THEREWITH

(75) Inventors: Jang Jin Yoo, Seoul (KR); Jong Hoon Woo, Uiwang-shi (KR)

(73) Assignee: LG Display Co., Ltd., Seoul (KR)

( * ) Notice: Subject to any disclaimer, the term of this patent is extended or adjusted under 35 U.S.C. 154(b) by 557 days.

(21) Appl. No.: 10/951,817

(22) Filed: Sep. 29, 2004

(65) Prior Publication Data

US 2005/0140848 A1    Jun. 30, 2005

(30) Foreign Application Priority Data

Dec. 29, 2003   (KR)   .................... 10-2003-0098938

(51) Int. Cl.
    *G09G 3/36*   (2006.01)
(52) U.S. Cl. .................................. 345/102; 345/204
(58) Field of Classification Search ........... 345/87–102, 345/204
    See application file for complete search history.

(56) References Cited

U.S. PATENT DOCUMENTS

| 6,561,663 | B2 * | 5/2003 | Adachi et al. | 362/616 |
| 6,669,350 | B2 * | 12/2003 | Yamashita et al. | 362/612 |
| 6,927,812 | B2 * | 8/2005 | Cho | 349/65 |
| 6,991,358 | B2 * | 1/2006 | Kokogawa | 362/619 |
| 7,357,973 | B2 * | 4/2008 | Obuchi et al. | 428/156 |
| 2001/0036068 | A1 * | 11/2001 | Suzuki et al. | 362/31 |
| 2004/0114396 | A1 * | 6/2004 | Kobayashi et al. | 362/561 |
| 2004/0135933 | A1 * | 7/2004 | Leu et al. | 349/61 |
| 2005/0030729 | A1 * | 2/2005 | Yu et al. | 362/31 |

FOREIGN PATENT DOCUMENTS

JP      2001-210122 A      8/2001

* cited by examiner

*Primary Examiner*—Ricardo L Osorio
(74) *Attorney, Agent, or Firm*—Birch, Stewart, Kolasch & Birch, LLP

(57) ABSTRACT

A backlight unit in a display device having a Divided Display Area Method (DDAM) of a Field Sequential (FS) driving method applied thereto is provided. The backlight unit includes first to (n)th light guiding plates for field sequential drive, and a plurality of light sources arranged at at least one side of the first to (n)th light guiding plates at certain intervals.

19 Claims, 14 Drawing Sheets

BACKLIGHT UNIT IN DISPLAY DEVICE AND LIQUID CRYSTAL DISPLAY DEVICE THEREWITH

CROSS-REFERENCE TO RELATED APPLICATIONS

This application claims the benefit of Patent Application No. P2003-98938, filed on Dec. 29, 2003 in Republic of Korea, which is hereby incorporated by reference.

BACKGROUND OF THE INVENTION

1. Field of the Invention

The present invention relates to backlight units, and more particularly, to a backlight unit in a display device having a Divided Display Area Method (DDAM) of a Field Sequential (FS) driving method applied thereto, in which a display area is divided into sections in driving the display area, and to a liquid crystal display device therewith.

2. Discussion of the Related Art

As one of display devices used generally, CRTs (Cathode Ray Tubes) are mostly used, starting from TV receivers to monitors in measuring instruments, information terminals, and the like. The CRT, however, fails to deal with the demand for small sized light weight products due to the weight and bulk of the CRT itself.

Accordingly, under the trend that various electronic products become smaller and lighter, the CRT has certain limitations in view of its weight and bulk. As displays that are expected to replace the CRTs, there are Liquid Crystal Display (LCD) which utilizes an electro-optical effect, Plasma Display Panel (PDP) which utilizes gaseous discharge, Electro Luminescence Display (ELD) which utilizes an electroluminescence effect, and the like. Among the various display devices, researches on the LCD are active.

For replacing the CRT, the LCD, which is advantageous in view of its small size, light weight, and low power consumption, has been developed actively to be used as a flat display device with satisfaction, not only as a monitor in a laptop computer, but also as a monitor of a desktop computer and a large sized information display device. As a result, the demand for the LCD is increasing.

A driving principle of the liquid crystal display device lies on optical anisotropy and polarity of a liquid crystal. Thin and elongated structures of the liquid crystal molecules are liable to be arranged in one direction, enabling to control a direction of molecular arrangement by applying an electric field to the liquid crystals, artificially. Therefore, if the direction of the molecular arrangement of the liquid crystals is changed, the molecular arrangement of the liquid crystals is changed to make a light to refract in the direction of the molecular arrangement of the liquid crystals, thereby enabling display of picture information.

Presently, Active Matrix LCD (AMLCD) in which thin film transistors, switching devices, and pixel electrodes connected thereto are arranged in a matrix is the most interested owing to its excellent resolution and moving picture reproduction capability.

A related art liquid crystal display device (LCD) which reproduces a picture by such a driving principle will be described referring to FIG. 1, which illustrates a section of a related art LCD, schematically.

Referring to FIG. 1, the related art LCD is provided with a liquid crystal display panel having first and second transparent glass substrates 1 and 10 bonded together with a gap therebetween, a liquid crystal layer 15 filled between the first and second glass substrates 1 and 10, and a backlight unit 16 on a back surface of the first glass substrate 1 for supplying a light to the liquid crystal display panel.

Formed on the first glass substrate 1 (a TFT array substrate), there are a plurality of gate lines arranged in one direction at regular intervals, a plurality of data lines arranged in a direction perpendicular to the gate lines at regular intervals, a matrix of pixel electrodes 2 in respective pixel regions each defined at a cross region of the corresponding gate line and the corresponding data line, and a plurality of thin film transistors (TFTs) 3 each arranged to be switchable in response to a signal on the corresponding gate line for transferring a signal on the corresponding data line to the corresponding pixel electrode.

Formed on the second glass substrate 10 (a color filter substrate), there are a black matrix layer 11 for shielding a light incident on regions excluding the pixel regions, a color filter layer 12 of R (Red), G (Green), and B (Blue) cells for transmitting a portion of a light of a particular waveband and absorbing the rest portions of the light, and a common electrode 14 for reproducing the picture. A reference symbol 13 denotes an overcoat layer.

The first and second substrates 1 and 10 are bonded with sealant having a liquid crystal injection hole formed therein and a gap formed by spacers, and have liquid crystals provided therebetween.

For convenience sake, FIG. 1 illustrates only one pixel region of the first and second glass substrates 1 and 10. The LCD requires a separate light source, i.e., a backlight unit 16 for adjusting an external light incident on the liquid crystal display panel, to display a picture.

A related art backlight unit will be described referring to FIG. 2, which illustrates a diagram for describing the related art backlight unit usable in the LCD of FIG. 1.

Referring to FIG. 2, the related art backlight unit is provided with a fluorescent lamp 21, a light guiding plate 22, a diffusion material 23, a reflective plate 24, a diffusion plate 25, and a prism sheet 26.

Upon application of a voltage to the fluorescent lamp 21, residual electrons present in the fluorescent lamp 21 move to an anode, during which the residual electrons collide with, and excite argon Ar to proliferate positive ions that hit onto cathode, to emit secondary electrons.

When the secondary electrons flow through the tube to start discharge, a flow of the electrons caused by the discharge collide with mercury vapor, and ionize the mercury, to emit a UV ray and a visible light. The UV ray excites a fluorescent material coated on an inside wall of the lamp, such that the fluorescent material emits a visible light.

The light guiding plate 22 is a wave-guide for receiving the light from the fluorescent lamp 21 and emitting a surface light toward an upper side, and is formed of PMMA (Poly Methyl Meth Acrylate) which has a good light transmittivity.

Parameters related to the light reception efficiency of the light guiding plate 22 are a thickness of the light guiding plate 22, a diameter of the lamp 21, a distance between the light guiding plate 22 and the lamp 21, a shape of the lamp reflective plate. In general, the light reception efficiency increases by placing the fluorescent lamp 21 aside in a thickness direction from a centerline of the light guiding plate 22.

For the light guiding plate 22 of the LCD backlight unit, there are printed type light guiding plates, V-cut type light guiding plates, and spread light guiding plates.

The diffusion material 23 is composed of $SiO_2$ grains, PMMA, solvent, and the like. The $SiO_2$ grains are porous, and used for scattering the light. The PMMA is used to attaching the SiO$_2$ grains to an underside surface of the light guiding plate 22.

The diffusion material 23 is coated on the underside surface of the light guiding plate 22 in dot forms, with an area of the dot increasing in an increment for obtaining a uniform surface light at an upper side of the light guiding plate 22. That is, an area ratio of the dot per unit area is smaller on a side close to the fluorescent lamp 21, and the area ratio of the dot per unit area is greater on a side far from the fluorescent lamp 21.

Here, the dot may have a variety of forms; however, the same luminance effect can be obtained at the upper side of the light guiding plate 22 regardless of the form of the dots as long as the area ratio of the dots per unit area is the same.

The reflective plate 24 on a back of the light guiding plate 22 directs the light from the fluorescent lamp 21 to an inside of the light guiding plate 22.

The diffusion plate 25 on the light guiding plate 22 having a dot pattern coated thereon provides a uniform luminance regardless of a viewing angle, is formed of PET or PC (Poly Carbonate) resin, and has a grain coated layer thereon for diffusing the light.

The prism sheet 26 is provided for enhancing a frontal luminance of the light transmitted to the upper side of the diffusion plate 25 and reflected. The prism sheet 26 transmits only a light incident thereon at a particular angle, and reflects other lights incident thereon at angles other than the particular angle to return such lights to a lower side of the prism sheet 26. The returned light then passes through the diffusion plates 22 and 25 and is reflected at the reflective plate 24 attached to the underside of the light guiding plate 22.

The backlight unit is fixed to a mold frame, and a display unit on top of the backlight unit is protected by a top sash. That is, the top sash and the mold frame are held together with the backlight unit and the display unit held therebetween.

However, the related art LCD has the following problems.

First, the low light transmittivity of the color filter layer of below 33%, with a great loss of the light, requires making the backlight brighter, which in turn leads to a greater power consumption.

Second, since the color filter layer is very expensive in comparison to other materials, the production cost of the LCD increases.

What is suggested for solving these problems of the LCD is the Field Sequential (FS) type LCD which can provide full colors without the use of the color filter layer of FIG. 1.

Although the related art backlight continuously supplies a white light to the liquid crystal display panel in a turned-on state, the FS type LCD selectively turns on R, G, B light sources of R, G, B backlight units for a frame at regular time intervals in sequence, for displaying a color picture.

Although the FS type was suggested around 1960, the practical application of the FS type has been difficult to achieve because technologies on a fast response liquid crystal mode, and a light source that meets the fast response are required to follow thereafter.

However, owing to the recent remarkable development of LCD technologies, the FS type LCD is suggested in which Ferroelectric Liquid crystal (FLC), Optical Compensated Bend (OCB), or TN (Twisted Nematic) liquid crystal mode having the fast response, and R, G, B backlights which can be turned on/off at a high speed are employed.

Particularly, as the liquid crystal mode for the FS type LCD, the OCB mode is used mostly. The OCB cell has upper and lower substrates having facing surfaces thereof rubbed in the same direction, and a certain voltage applied thereto, to make the liquid crystal molecules to move at a fast speed upon the application of a voltage thereto, which makes a time period required for rearrangement of the liquid crystal molecules, i.e., a response time period, very short, around within 5 msec. According to this configuration, since the OCB mode liquid crystal cell leaves no residual image on a screen owing to the fast response characteristic, the OCB mode liquid crystal cell is suitable to the FS type LCD.

FIG. 3 illustrates a section of a related art FS type LCD, schematically.

Referring to FIG. 3, the related art FS type LCD is provided with an upper substrate 30, a lower substrate 35 which is an array substrate, a liquid crystal layer 38 filled between the upper and lower substrates 30 and 35, and a R, G, B three color backlight unit 39 for supplying a light to a liquid crystal display panel of the upper and lower substrates 30 and 35 and the liquid crystal layer 38.

On surfaces of the upper and lower substrates 30 and 35 facing the liquid crystal layer 38, there are a common electrode 32 and a pixel electrode 36 for serving as electrodes that apply a voltage to the liquid crystal layer 38.

Between the upper substrate 30 and the common electrode 32, there is a black matrix 31 for shielding a light incident on regions excluding the pixel electrodes 36 on the lower substrate 35.

On the lower substrate 35, there is a thin film transistor T 37 (a switching device electrically connected to the pixel electrode 36) formed at a position opposite to the black matrix 31 on the upper substrate 30.

The thin film transistor T 37 is provided with a gate electrode, and source and drain electrodes, which are not shown. An unexplained reference numeral 40 denotes an overcoat layer.

For convenience sake, only one pixel region of the upper and lower substrates 30 and 35 is shown in FIG. 3.

The features of the FS type LCD that are most distinctive from the related art LCD are that the color filter is not needed and the R, G, B light sources of the backlight unit are separately turned on/off.

For convenience sake, the backlight unit with the R, G, B light sources will be called as a R, G, B backlight unit.

The R, G, B backlight unit 39 is driven by one inverter (not shown), such that each of the R, G, B light sources are lit 60 times per a second, total of 180 times, to cause a residual effect and to mix the R, G, B colors for expressing a color.

The 180 times of lighting on and off of the R, G, B light sources in the R, G, B backlight unit 39 are not noticeable to a viewer such that the overall effect is as if the light sources are kept lit. For example, successive lighting of the R light source and the B light source makes a person to view a violet color due to the residual effect.

That is, the FS type LCD, without the color filter layer, is suitable for a large sized LCD, because the FS type LCD overcomes the problem(s) of the related art LCD of poor overall luminance caused by the low light transmittivity of the color filter. The FS type LCD expresses full colors by means of the three color backlight unit, thereby enabling to provide a liquid crystal display panel having a high luminance, a high definition, and low cost owing to the omission of the expensive color filter layer. As described, even if the related art LCD is behind the CRT in terms of price and definition, the FS type can solve such problems.

As described, since most of the LCDs are light receptive devices in which an external light incident thereon is adjusted to display a picture, a separate light source for directing a light to the liquid crystal display panel, i.e., the backlight unit, is essential.

In general, among the backlight units of the LCD, there are an edge type and a direct type depending on the type of arrangement of the lamps.

The direct type backlight unit has lamps arranged on a flat surface, but has a limitation in fabrication of thin LCD because it is required to maintain a gap between the lamps and the liquid crystal panel for preventing a form of the lamp from showing on the liquid crystal panel, and to arrange light spreading means for uniform distribution of light on the whole device.

Moreover, the greater the size of the panel, the larger the area of a light emissive surface of the backlight unit. In the case of a large sized direct type backlight unit, since the light emissive surface can not be flat if an adequate thickness of the light spreading means can not be secured, it is required to secure an adequate thickness of the light spreading means so that the light emissive surface can be flat.

In the meantime, the edge type backlight unit having lamps arranged at an outer side for spreading a light to the entire surface of the device by using a light guiding plate, has a problem of poor luminance because the light is required to pass the light guiding plate. Moreover, for uniform distribution of the light, high optical design and fabrication technologies are required.

Since both the direct type backlight unit and the edge type backlight unit have disadvantages of their own, the direct type backlight unit is used in an LCD that requires effective luminance rather than a thin screen, and the edge type backlight unit is used in an LCD that requires thinness rather than luminance, such as a notebook PC or a monitor PC.

FIGS. 4A and 4B illustrate sections of related art FS type LCD backlight units respectively, wherein FIG. 4A illustrates an edge type backlight unit and FIG. 4B illustrates a direct type backlight unit.

The edge type R, G, B backlight unit 40 in FIG. 4A is provided with R, G, B light sources arranged in a line at one side or opposite sides of the liquid crystal display panel 41, and a light guiding plate and a reflective plate, both of which are not shown, for receiving and spreading a light from the light sources. A Cold Cathode Fluorescent Lamp (CCFL) is mostly used as the light source, and the edge type R, G, B backlight unit 40 is suitable for application to a portable computer because the computer is light and thin, and has a low power consumption.

The direct type R, G, B backlight unit 45 in FIG. 4B is provided with R, G, B light sources 46 under the diffusion plate 47, for directing a light to the entire surface of the liquid crystal display panel, in which a plurality of units of the R, G, B light sources 46 are arranged in a line horizontally.

The direct type backlight unit, mostly used in a display device that regards the luminance important, has a high power consumption because the direct type itself is thick and spreads light effectively for maintaining uniformity of the luminance.

FIG. 5A illustrates a portion of an array substrate provided for describing a driving method of a related art FS type LCD.

Referring to FIG. 5A, formed on the lower substrate (generally an array substrate) of the LCD, there are gate lines 50 running in a width direction, data lines 51 running in a direction perpendicular to the gate lines 50, thin film transistors T each at the cross of the corresponding gate line 50 and data line 51, and pixel electrodes 52 electrically connected to the thin film transistors T.

The related art LCD is driven by applying a picture signal to the data line 51, and applying electric pulses to the gate line 50 in a scanning fashion.

In driving the LCD by applying a gate pulse voltage to the gate lines 50 selectively, a line sequential driving method is used for improving a picture quality, in which the voltage is applied line by line while moving to an adjacent line in succession by using a gate scanning input device until the gate pulse voltage is applied to all the gate lines 50 when one frame is completed.

That is, upon application of the gate pulse voltage to an (n)th gate line, all the thin film transistors T connected to the gate line having the gate pulse voltage applied thereto are turned on at the same time, and a picture signal on the data line is accumulated on the liquid crystal cell and a storage capacitor through the corresponding thin film transistors T that are turned on.

Eventually, the liquid crystal molecules in the liquid crystal cell are rearranged according to the data picture signal accumulated on the liquid crystal cell, and the light from the backlight unit passes to reproduce a desired picture.

FIG. 5B illustrates a time chart of the related art FS type LCD driving method.

In general, in driving the FS type LCD, after scanning all the thin film transistors for each of the R, G, B light sources, the R, G, B light sources are lit respectively when the liquid crystals are rearranged following the application of the next voltage. That is, for the entire driving area, each of the light sources in the backlight unit is lit once for one frame.

It is required that each of the light sources completes this driving process within 1 cycle (f/3, f: frame frequency). That is, as shown in FIG. 5B, in view of one light source, one cycle is:

$$F/3\ (55) = tTFT(56) + tLC(57) + tBL(58)$$

Where, F: one frame time,
tTFT: a scanning time of the entire thin film transistor,
tLC: a response time period of an assigned liquid crystal, and
tBL: a backlight flash time period.

In this instance, if tBL(58) is fixed and if tTFT(56) increases according to a design condition of the LCD, a required size of tLC(57) is reduced because an interval between frames is fixed. If tLC is reduced which leads to prolonging the actual response time period of the assigned liquid crystal beyond the allotted response time period of the assigned liquid crystal, the backlight is lit before the assigned liquid crystal is rearranged properly, which causes a problem of non-uniform distribution of a picture color.

FIG. 6 illustrates a sequence diagram of a frame unit color picture display of the related art FS type LCD and depicts application of R, G, B lights onto an LCD panel 61 for difficult time durations. In displaying a color picture on the related art FS type LCD, one frame time period (F) is set to 1/60 seconds, and each of the R, G, B three color light sources of the R, G, B backlight unit is turned on/off in sequence for 1/180 seconds (5.5 msec) within the 1/60 seconds. In this instance, the actual turn-on time period of each of the R, G, B light sources in one frame is shorter than 1/180 seconds, for preventing R, G, B colors from interfering with each other if the R, G, B light sources reproduce pictures in a continuously turned-on state.

Referring to FIG. 6, the related art FS type LCD displays color pictures by turning on/off the R, G, B light sources 60a, 60b, and 60c for 1/180 seconds respectively in succession for three sub-frames s1, s2, and s3 in one frame F. The frame F is a basic unit of a picture, for R, G, B respectively.

The related art FS driving method has in general a slow liquid crystal response speed such that it is difficult to drive all the gate lines within one frame. In order to solve this problem, the DDAM (Divided Display Area Method) is used in which a display area is divided into many sections.

A backlight unit in the related art LCD driven by the DDAM will now be described referring to FIG. 7.

Referring to FIG. 7, the related art LCD driven by the DDAM is provided with two LED light sources 72 at opposite sides of a light guiding plate 71 on an underside surface of a liquid crystal display panel (not shown) for illuminating the liquid crystal display panel, thereby enabling to display a picture even in a dark place.

Each LED light source 72 has a plurality of R, G, B LED lamps 73 arranged one dimensionally on a PCB (printed circuit board) or FPC (flexible printed circuit) substrate. The light guiding plate 71 is divided into 4 regions 71a-71d for driving a liquid crystal screen in succession. The liquid crystal screen is divided into first to fourth areas corresponding respectively to the first to fourth regions 71a, 71b, 71c, and 71d of the plate 71. The light guiding plate 71 is not physically separated into the four areas, but is integrally divided by operation. That is, no gaps exist between the divided regions 71a-71d because they are all integral part of one light guiding plate 71.

The R, G, B LED lamps 73 are lit by applying a voltage to each of the R, G, B LED lamps 73 for illuminating the divided regions separately, to spread the R, G, B lights within the light guiding plate 71 and to illuminate the back surface of the liquid crystal display panel in succession.

Thus, one of the R, G, B LED lamps 73 in the LED light source 72 relevant to a divided region of the light guiding plate 71 to be driven is lit in succession, so that the liquid crystal display panel reproduces a picture in a field sequence.

However, at the time of the sequential driving by sequential lighting of one of the R, G, B LED lamps 73 relevant to a divided region of the light guiding plate 71 to be driven in succession (driven by DDAM), light leakage to the adjacent regions of the light guiding plate and the liquid crystal display panel other than the driving region drops the display performance and deteriorates the quality of the image being displayed.

SUMMARY OF THE INVENTION

Accordingly, the present invention is directed to a backlight unit in a display device and a liquid crystal display device therewith that substantially obviate one or more problems due to limitations and disadvantages of the related art.

An object of the present invention is to provide a backlight unit in a display device, in which light leakage to an adjacent region other than a driving region is suppressed in driving a frame divided by DDAM in an FS driving method for improving a display performance, and a liquid crystal display device therewith.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight unit suitable for a display device, the backlight unit comprising first to (n)th light guiding plates for field sequential drive, and a plurality of light sources arranged at at least one side of the first to (n)th light guiding plates at certain intervals.

According to an aspect of the present invention, there is provided a display device comprising a backlight unit including first to (n)th light guiding plates for field sequential drive, and a plurality of light sources arranged at at least one of side of the first to (n)th light guiding plates at certain intervals, and a liquid crystal display panel for receiving a light from the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A backlight unit in a display device in accordance with a first preferred embodiment of the present invention has a plurality of light guiding plates corresponding to divided regions of the display screen.

Figure 1:
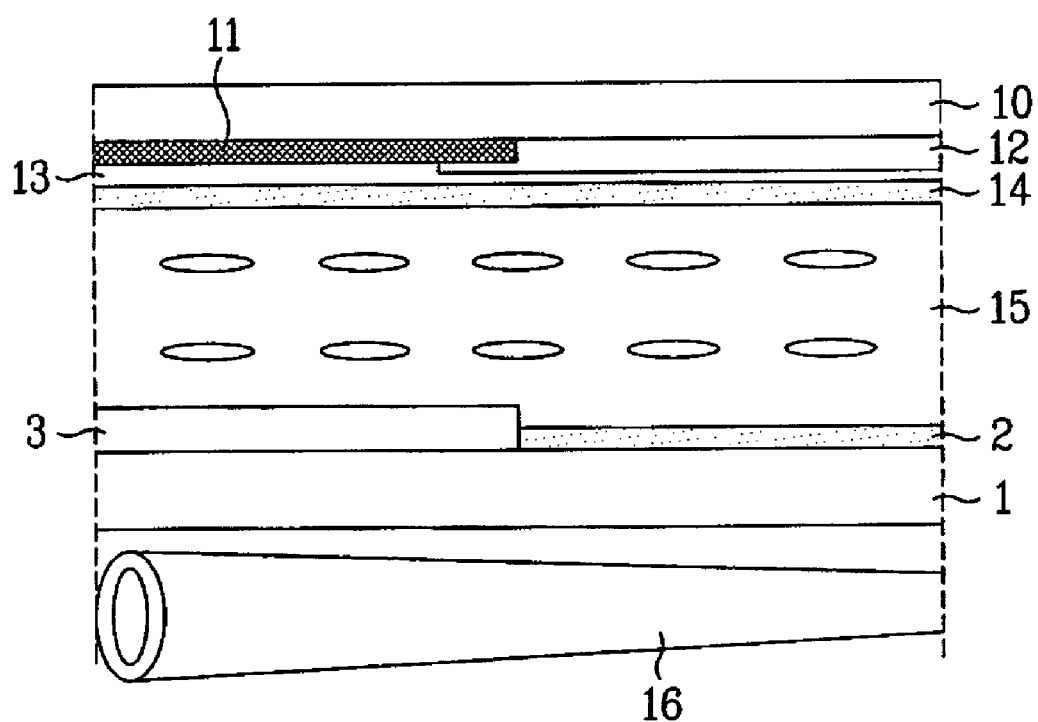
FIG. 1 illustrates a section of a related art LCD, schematically.
Figure 2:
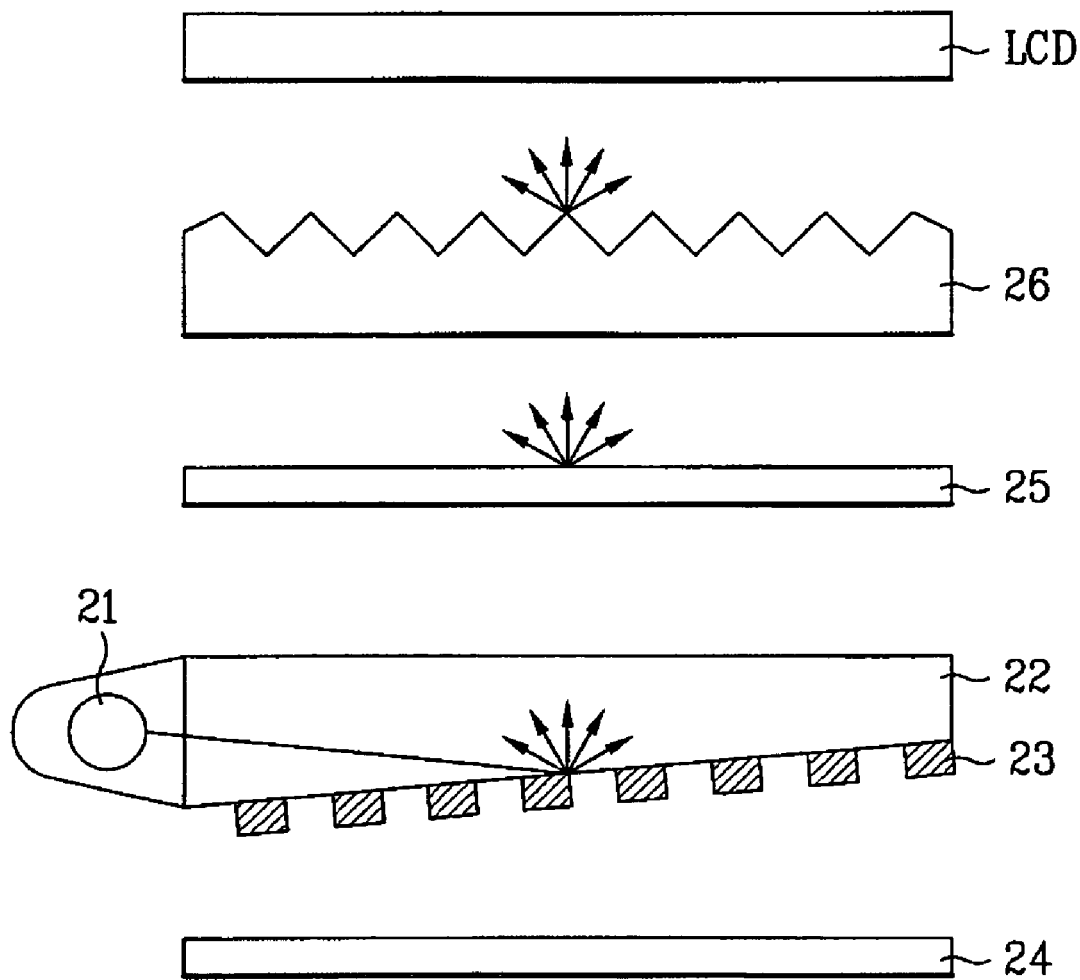
FIG. 2 illustrates a diagram for describing a related art backlight unit.
Figure 3:
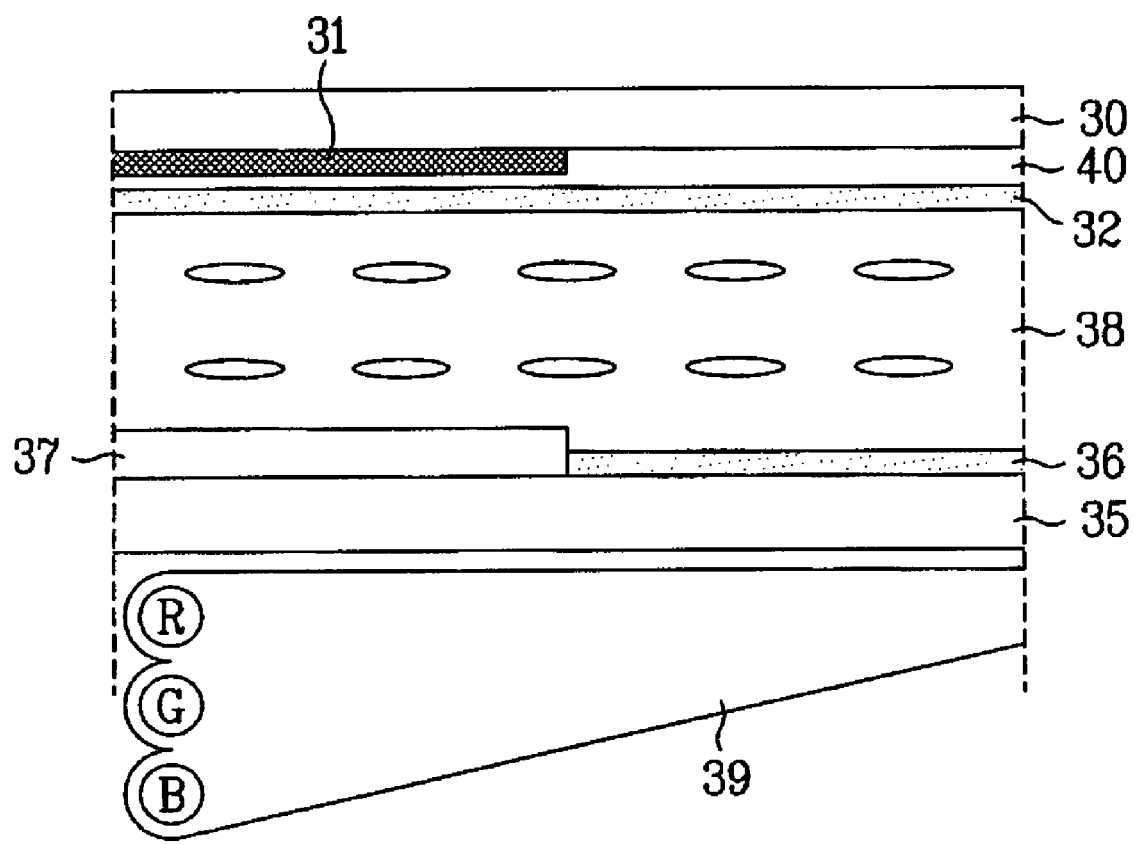
FIG. 3 illustrates a section of a related art FS type LCD, schematically.
Figure 4A:
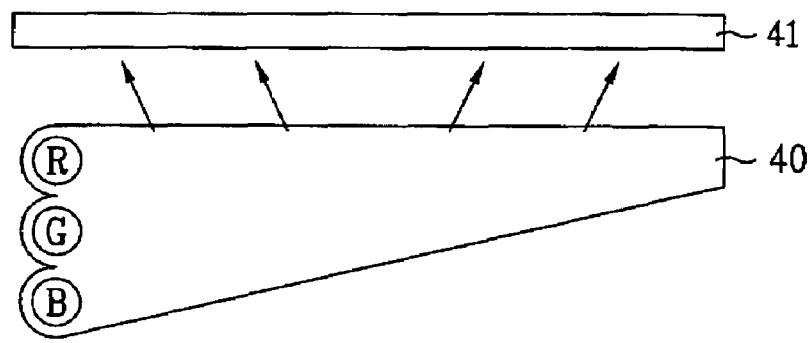
FIG. 4A illustrates a section of an edge type three color backlight unit in a related art FS type LCD.
Figure 4B:
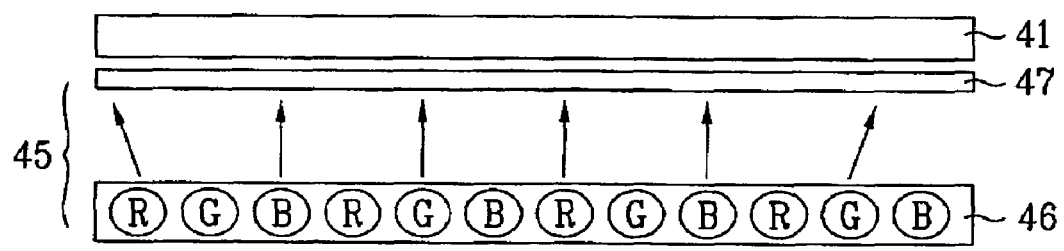
FIG. 4B illustrates a section of a direct type three color backlight unit in a related art FS type LCD.
Figure 5A:
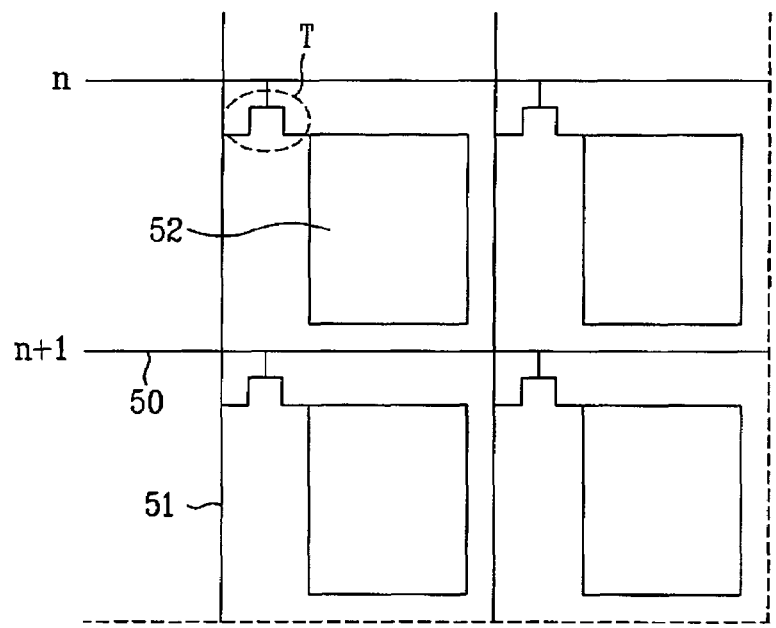
FIGS. 5A and 5B illustrate diagrams for describing a driving method of a related art FS type LCD.
Figure 5B:
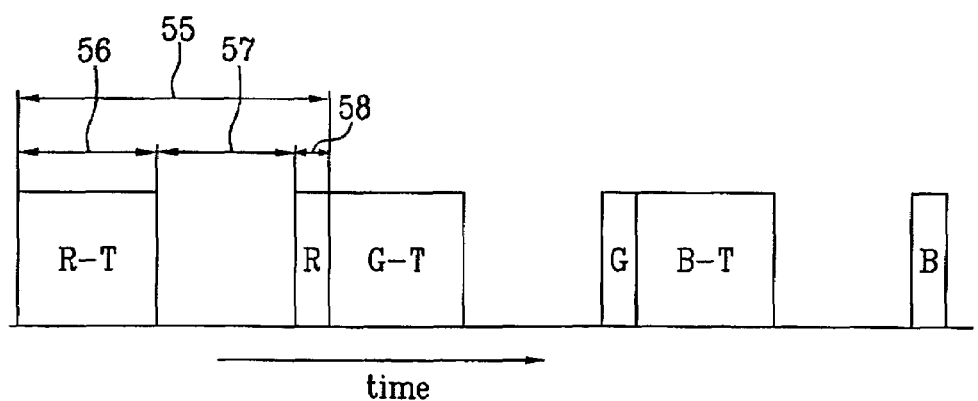
Figure 6:
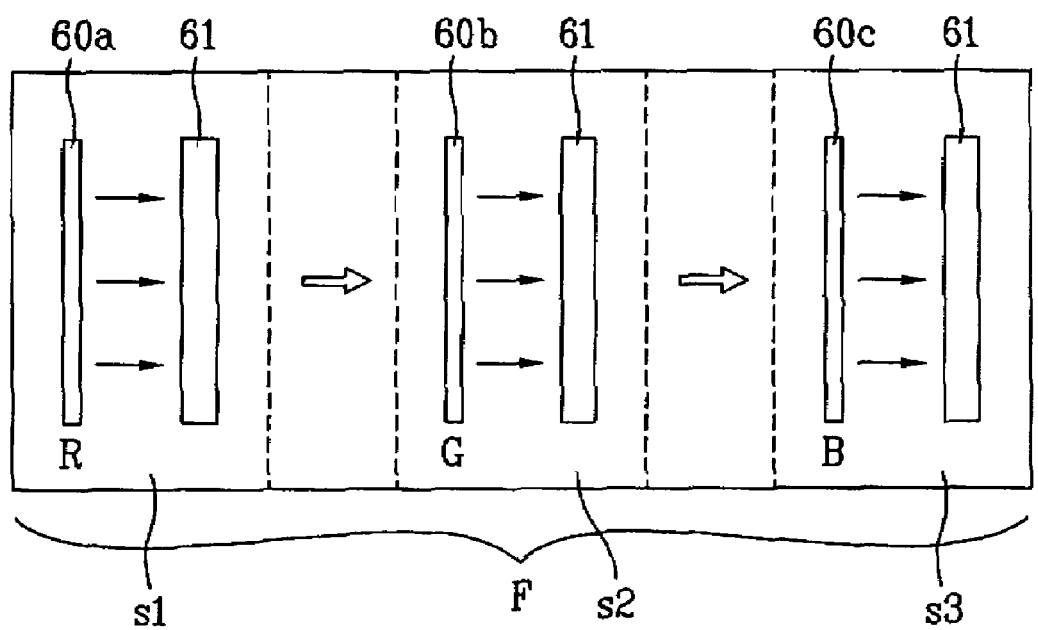
FIG. 6 illustrates a sequence diagram of a frame unit color picture display on the related art FS type LCD.
Figure 7:
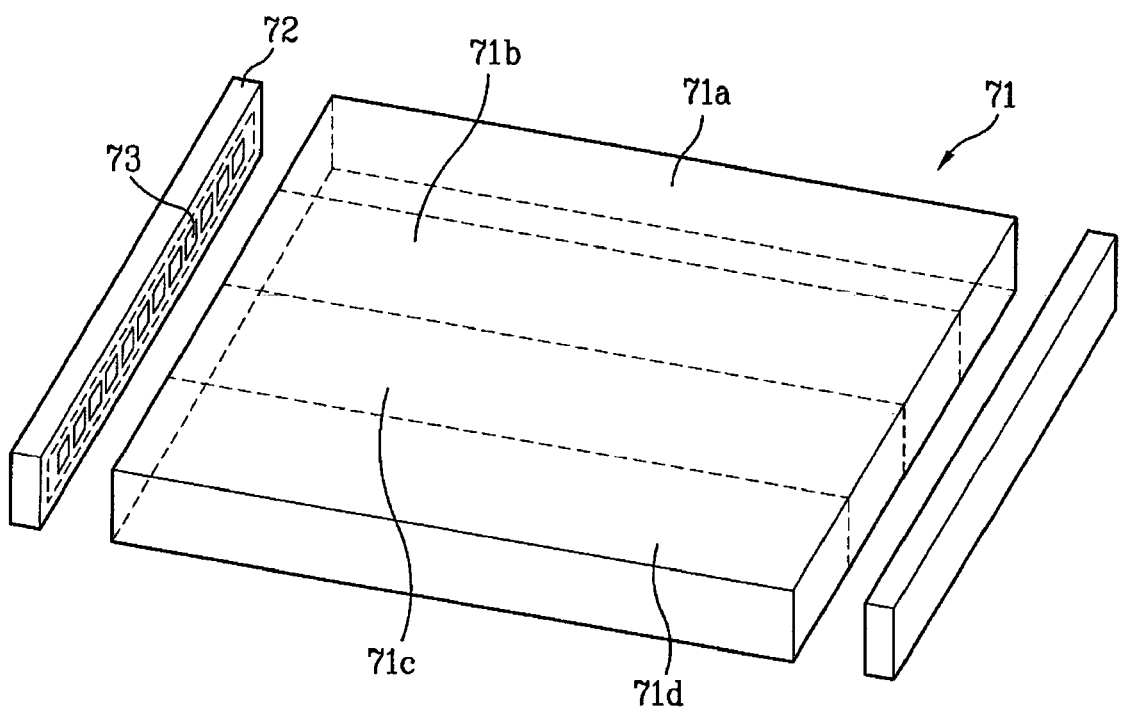
FIG. 7 illustrates a perspective view of a related art backlight unit of driven by a DDAM.
Figure 8:
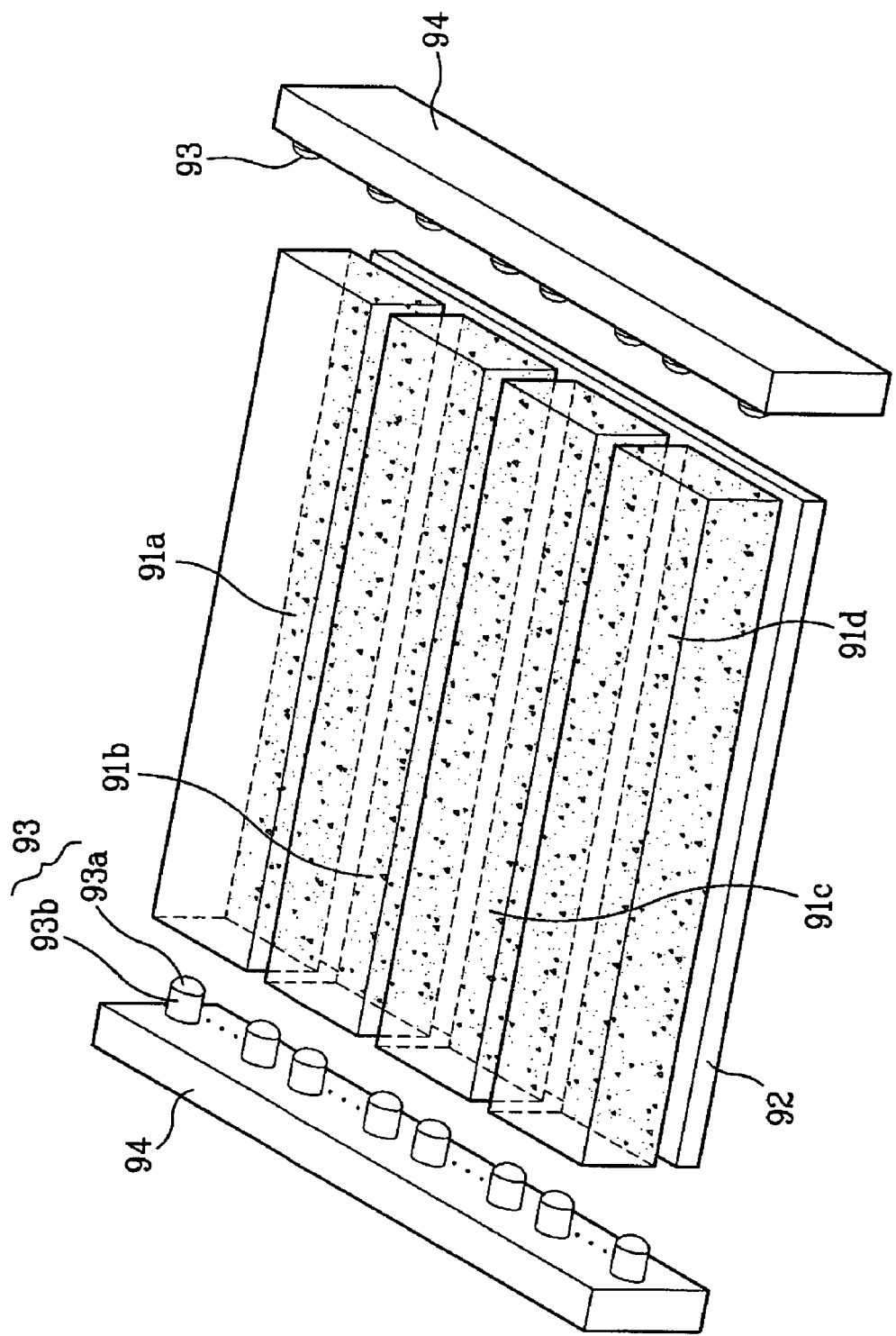
FIG. 8 illustrates a perspective view of an FS type backlight unit in accordance with a first preferred embodiment of the present invention.
Figure 9A:
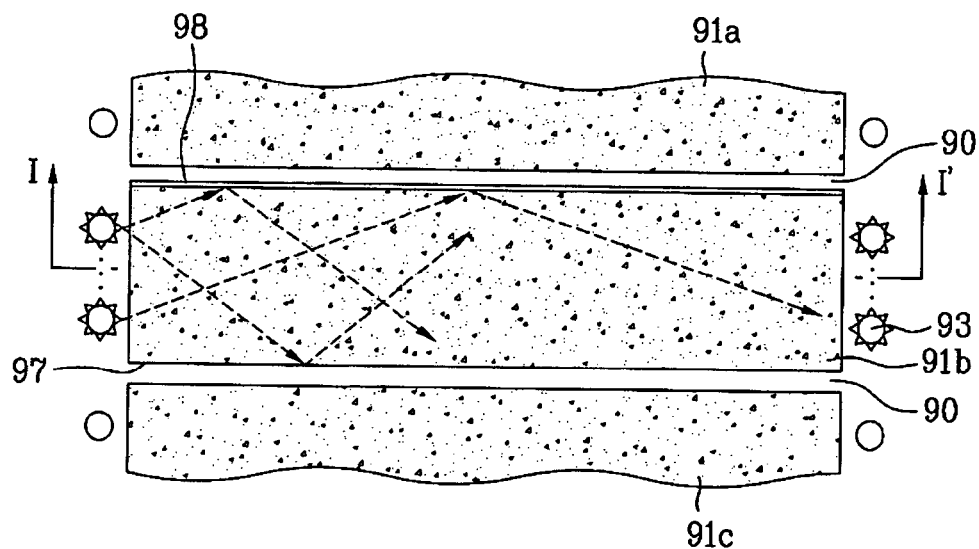
FIG. 9A illustrates a plan view showing driving of the backlight unit of FIG. 8 in accordance with the first preferred embodiment of the present invention.
Figure 9B:
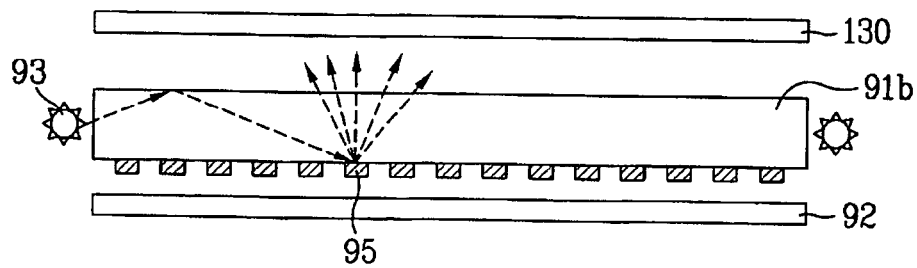
FIG. 9B illustrates a sectional view across a line I-I' in FIG. 9A.

As an example, FIG. 8 illustrates a perspective view of an FS type backlight unit in accordance with the first preferred embodiment of the present invention, FIG. 9A illustrates a plan view showing the driving of the backlight unit in FIG. 8 in accordance with the first preferred embodiment of the present invention, and FIG. 9B illustrates a sectional view across the line I-I' in FIG. 9A.

The present invention suggests driving a display region with the display region divided into 'n' sub-regions. Hereafter, as an example, a four-division driving backlight unit will be described, in which four separate light guiding plates are provided and correspond to 4 sub-regions.

Referring to FIG. 8, the backlight unit includes first to fourth light guiding plates 91a, 91b, 91c, and 91d, a lower reflective plate 92 under the first to fourth light guiding plates 91a, 91b, 91c, and 91d, a plurality of LED lamps 93 at opposite sides of the first to fourth light guiding plates 91a, 91b, 91c, and 91d arranged at regular intervals, and PCB substrates 94 or FPC at the opposite sides of the first to fourth light guiding plates 91a, 91b, 91c, and 91d and having the plurality of LED lamps 93 arranged thereon. The light guiding plates 91a-91d are separated from each other with a certain air gap 90 (FIG. 9A) therebetween.

Each LED lamp 93 includes a light emitting portion 93a and a body portion 93b on the PCB substrate 94 or the FPC. The LED lamps 93 are arranged to form a line on each PCB/FPC 94. There are a plurality of dot patterns 95 (FIG. 9B) printed on an underside surface of the first to fourth light guiding plates 91a, 91b, 91c, and 91d.

The backlight unit is driven starting from the first light guiding plate 91a to the fourth light guiding plate 91d in succession, wherein a light received at each of the light guiding plates from the corresponding LED lamp(s) 93 is reflected totally due to a difference of refractive indices of air (from the air gap 90) and the light guiding plate. This suppresses the transmission of the light to other light guiding plates and directs the light only to the currently-used light guiding plate.

FIG. 9A illustrates, as an example, a plan view showing that a light is received in the second light guiding plate 91b from the corresponding LED lamp(s) 93, wherein it can be noted that the light received in the second light guiding plate 91b from the LED lamps 93 facing the second light guiding plate 91b is reflected totally within the second light guiding plate 91b due to the difference of refractive indices between the second light guiding plate 91b and the air in the gap 90, which prevents or suppresses the transmission of the light to the other light guiding plates (i.e., the first, third, and fourth light guiding plates 91a, 91c, and 91d).

Referring to FIG. 9B, the light received in the second light guiding plate 91b is scattered by the dot patterns 95 printed on the underside surface of the second light guiding plate 91b, and transmitted to the liquid crystal display panel located above the light guiding plates.

Further, a light spreading means 130 can be provided over the first to fourth light guiding plates 91a-91d to more evenly distribute the light to the display panel above the light spreading means 130. The light spreading means can be one or more diffuser plates or diffuser sheets. The light spreading means 130 also eliminates bright lines or dark lines that can form at the boundaries of the light guiding plates or at areas between the light guiding plates, thereby enhance the uniformity of luminance.

In addition to or in lieu of the light spreading means 130, the side surfaces of one or more light guiding plates 91a-91d can be polished (97), e.g., mirror-polished, to further prevent leakage of light to adjacent light guiding plates that are currently not used. Instead of providing polished surfaces, any other means to prevent leakage of light to adjacent light guiding plates may be used. For instance, a reflective type adhesive tape 98 can be placed on the side surface(s) of one or more light guiding plates 91a-91d.

Accordingly, each of the light guiding plates of the present invention suppresses leakage of light to adjacent light guiding plates that are not being used because the light received in the currently-used light guiding plate is reflected totally within that light guiding plate.

The backlight unit in a display device in accordance with a second preferred embodiment of the present invention is the same as the backlight unit of the first embodiment, except that it further includes one or more side reflective plates between the light guiding plates.

Figure 10:
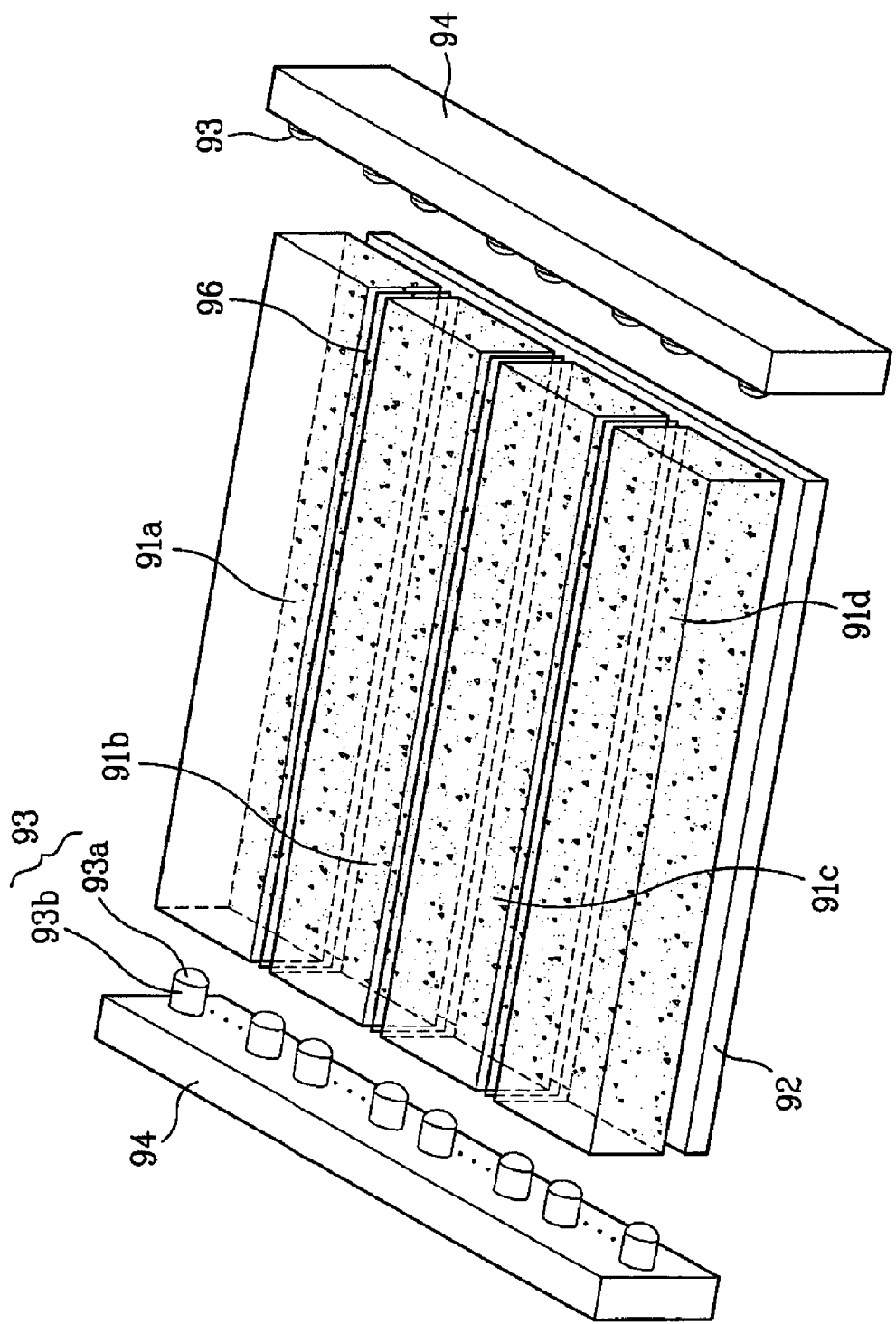
FIG. 10 illustrates a perspective view of an FS type backlight unit in accordance with a second preferred embodiment of the present invention.
Figure 11A:
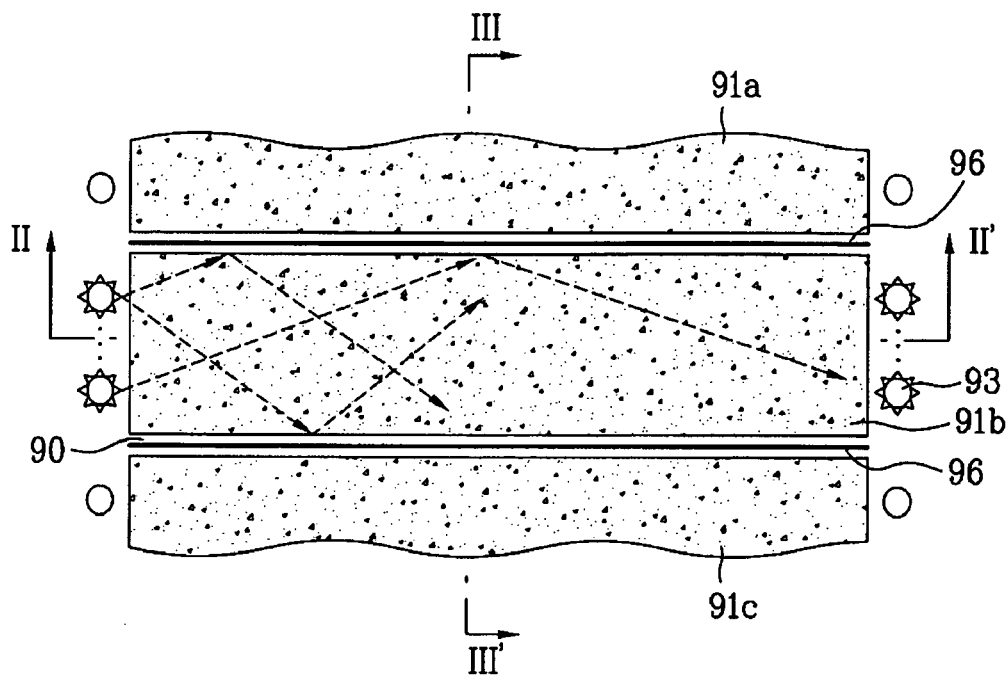
FIG. 11A illustrates a plan view showing driving of the backlight unit of FIG. 10 in accordance with the second preferred embodiment of the present invention.
Figure 11B:
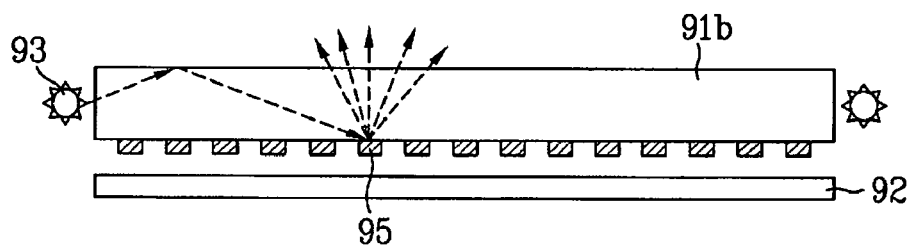
FIG. 11B illustrates a sectional view across a line II-II' in FIG. 11A.
Figure 11C:
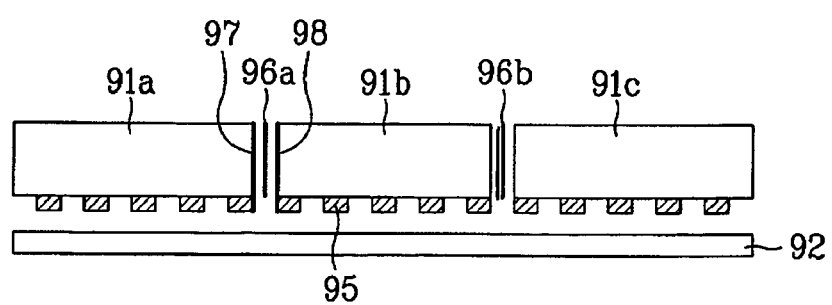
FIG. 11C illustrates a sectional view across a line III-III' in FIG. 11A.
Figure 11D:
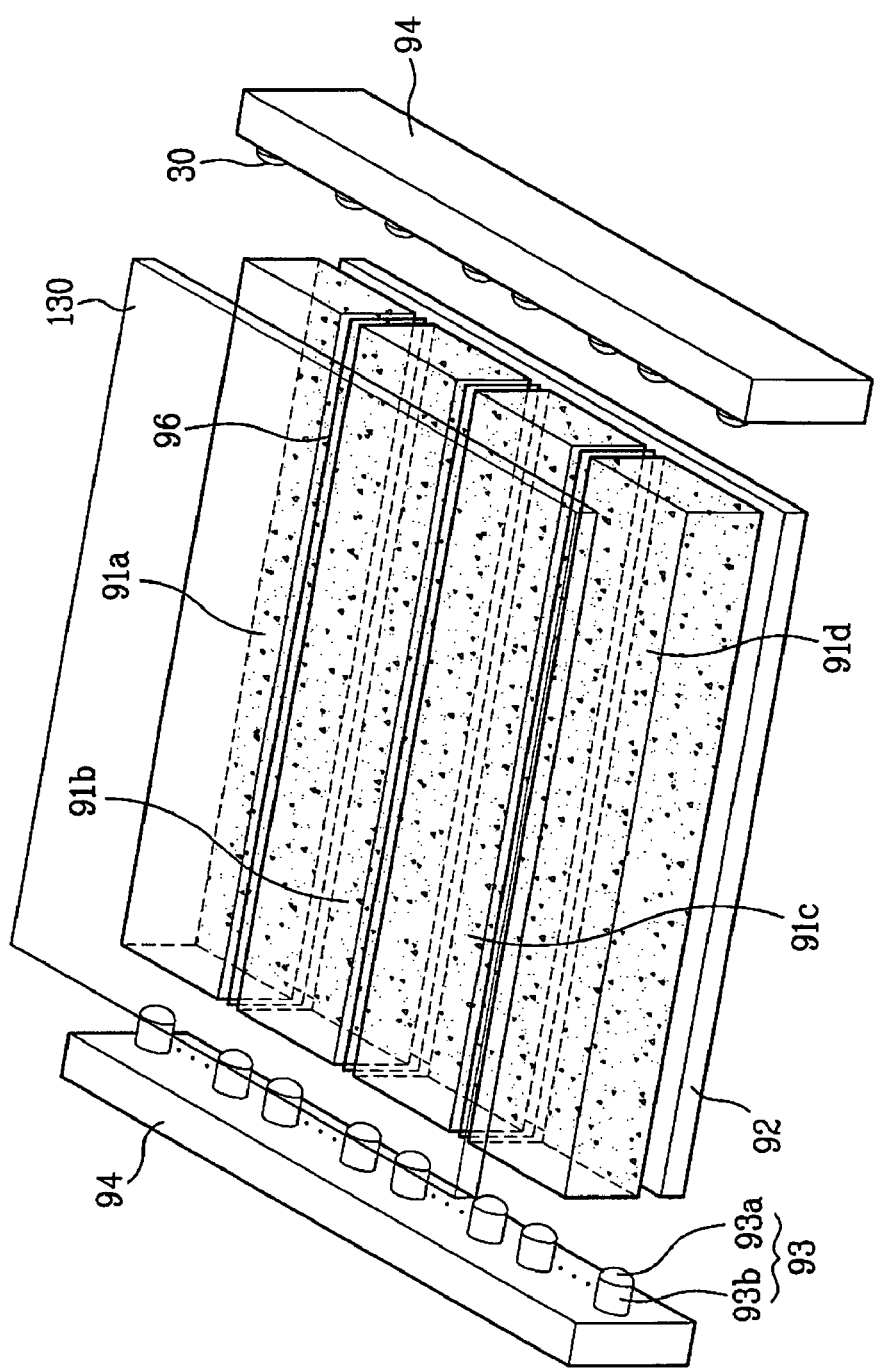
FIG. 11D illustrates a light spreading part of the backlight unit of FIG. 10.

FIG. 10 illustrates a perspective view of an FS type backlight unit in accordance with the second preferred embodiment of the present invention, FIG. 11A illustrates a plan view showing driving of the backlight unit in FIG. 10 in accordance with the second preferred embodiment of the present invention, FIG. 11B illustrates a sectional view across the line II-II' in FIG. 11A, FIG. 11C illustrates a sectional view across the line III-III' in FIG. 11A, and FIG. 11D illustrates a light spreading means 130 provided in the backlight unit of FIG. 10.

As in the first embodiment of the present invention, the display region according to the second embodiment is driven by dividing the display region into 'n' sub-regions and selectively driving these sub-regions. A four-division driving backlight unit will be described as an example in which there are four light guiding plates 91a-91d for one display screen.

In more detail, referring to FIG. 10, the backlight unit includes the first to fourth light guiding plates 91a, 91b, 91c, and 91d for field sequential driving, one or more side reflective plates 96 between the side surfaces of the first to fourth light guiding plates 91a, 91b, 91c, and 91d, the plurality of LED lamps 93 at one side or opposite sides of the first to fourth light guiding plates 91a, 91b, 91c, and 91d arranged at regular intervals, and the PCB substrate 94 or an FPC substrate at each of the opposite sides of the first to fourth light guiding plates 91a, 91b, 91c, and 91d having the plurality of lamps 93 arranged thereon. The light guiding plates 91a-91d are separated from each other with an air gap 90 (FIG. 11A) therebetween.

The side reflective plate 96 can be provided at each gap 90 between the first to fourth light guiding plates 91a-91d, or at only certain gaps 90 such that there can be a gap 90 which does not include the side reflective plate 96. As shown in FIG. 11C, the side reflective pate 96 can be a double-sided reflective plate 96a having two sides that are both reflective, or can be two of one-sided reflective plate 96b. One-sided reflective plate 96b has only one reflective side, which is placed to face directly the side of the light guiding plate.

Each LED lamp 93 includes a light emitting portion 93a and a body portion 93b on the PCB substrate 94. The LED lamps 93 are arranged to form a line on each PCB/FPC 94.

There are a plurality of dot patterns 95 printed on an underside surface of the first to fourth light guiding plates 91a, 91b, 91c, and 91d.

The backlight unit is driven starting from the first light guiding plate 91a to the fourth light guiding plate 91d in succession, wherein a light received at each of the light guiding plates from the corresponding LED lamp(s) 93 is reflected totally within the light guiding plate due to a difference of refractive indices of air (from the air gap 90) and the light guiding plate. This suppresses the transmission of the light to other light guiding plates and directs the light only to the currently used light guiding plate.

As shown in FIGS. 11A and 11C, as an example, the transmission of the light received in the second light guiding plate 91b from the LED lamp(s) 93 facing the second light guiding plate 91b to the adjacent light guiding plates (i.e., the first, third, and fourth light guiding plates 91a, 91c, and 91d) is suppressed by the inside total reflection coming both from a difference of refractive indices of the second light guiding plate 91b and air and the side reflective plate 96 placed between adjacent division surfaces.

Referring to FIG. 11B, the light received in the second light guiding plate 91b is scattered by the dot patterns 95 printed on the underside surface of the second light guiding plate 91b, and transmitted to the liquid crystal display panel.

Further, as shown in FIG. 11D, the light spreading means 130 can be provided over the first to fourth light guiding plates 91a-91d to more evenly distribute the light to the display panel above the light spreading means 130. The light spreading means can be one or more diffuser plates or diffuser sheets. The light spreading means 130 also eliminates bright lines or dark lines that can form at the boundaries of the light guiding plates or at areas between the light guiding plates, thereby enhance the uniformity of luminance.

In addition to or in lieu of the light spreading means 130, as shown in FIG. 11C, the side surfaces of one or more light guiding plates 91a-91d can be polished (97), e.g., mirror-polished, to further prevent leakage of light to adjacent light guiding plates that are currently not used. Instead of providing polished surfaces, any other means to prevent leakage of light to adjacent light guiding plates may be used. For instance, a reflective type adhesive tape 98 can be placed on the side surface(s) of one or more light guiding plates 91a-91d.

In the first and second embodiments of the present invention, the LED lamps 93 are red (R), green (G) and blue (B) LED lamps that are arranged in a certain sequence. In this regard, at least one set of R, G, B LED lamps may be arranged in a line to correspond to each of the light guiding plates.

A liquid crystal display device having the foregoing backlight unit applied thereto and a circuit for driving the same will be described according to the present invention.

Figure 12:
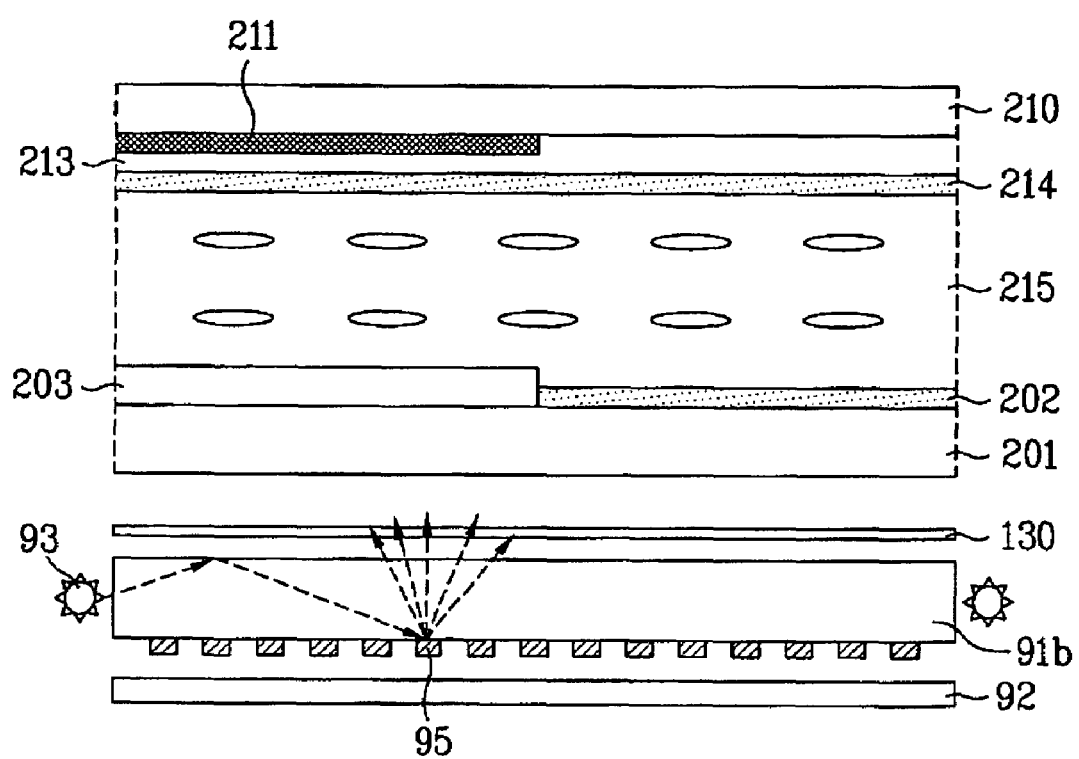
FIG. 12 illustrates a section of an LCD with a backlight unit of the present invention.
Figure 13:
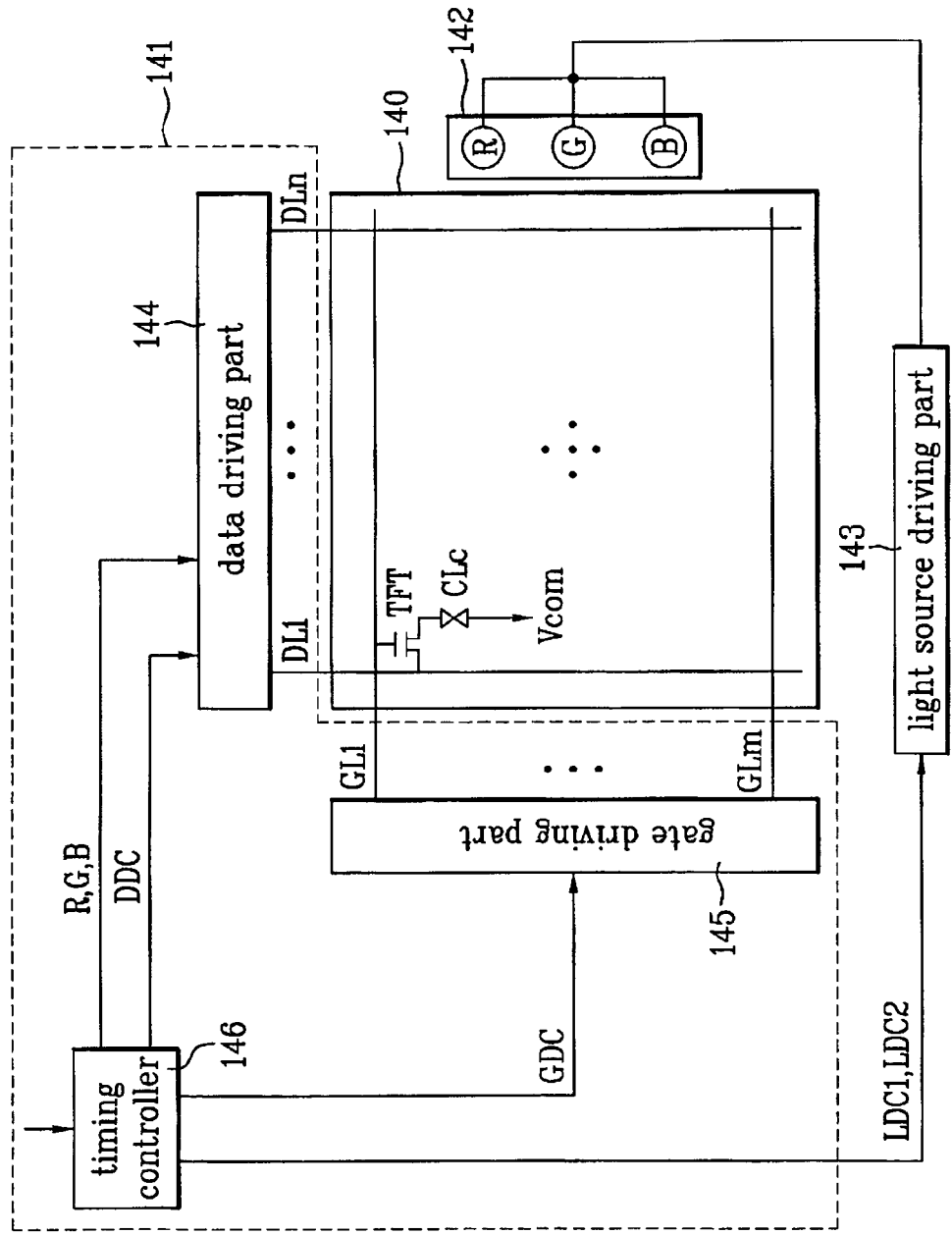
FIG. 13 illustrates a driving circuit for an LCD according to the present invention.

FIG. 12 illustrates a section of an LCD with a backlight unit of the present invention, and FIG. 13 illustrates a driving circuit for the LCD of FIG. 12 according to the present invention. The backlight unit in FIG. 12 is the backlight unit discussed above according to the various embodiments of the present invention.

Referring to FIG. 12, the LCD with the backlight unit of the present invention includes a liquid crystal display panel having first and second transparent glass substrates 201 and 210 bonded with a gap therebetwen on the backlight unit, and a liquid crystal layer 215 filled between the first and second glass substrates 201 and 210. The light spreading means 130 may be provided as discussed herein.

Formed on the first glass substrate 201 (a TFT array substrate), there are a plurality of gate lines arranged in one direction at regular intervals, a plurality of data lines arranged in a direction perpendicular to the gate lines at regular intervals, a matrix of pixel electrodes 202 in respective pixel regions each defined at a cross of the corresponding gate line and the corresponding data line, and a plurality of thin film transistors T 203 each arranged to be switchable in response to a signal on the corresponding gate line for transferring a signal on the corresponding data line to the corresponding pixel electrode.

Formed on the second glass substrate 210, there are a black matrix layer 211 for shielding a light incident on regions excluding the pixel regions, and a common electrode 214 for reproducing the picture. Reference numeral 213 denotes an overcoat layer.

The first and second substrates 201 and 210 are bonded with sealant having a liquid crystal injection hole formed therein, and a gap formed by spacers, and have liquid crystals injected therebetween.

For convenience sake, FIG. 12 illustrates only one pixel region of the first and second glass substrates 1 and 10, but it is known that the LCD device includes a plurality of pixel regions.

A method for driving the LCD with the backlight unit of the present invention will be described referring to FIG. 14 illustrating a driving circuit for the LCD in FIG. 12 according to the present invention.

Referring to FIG. 14, the circuit for driving the LCD with the backlight unit of the present invention includes a liquid crystal display panel 140 having a plurality of gate lines G (GL1~GLm) and data lines D (DL1~DLn) arranged perpendicular to each other to have a matrix of pixel regions, a driving circuit part 141 for supplying a driving signal and a data signal to the liquid crystal display panel 140, a backlight unit 142 for providing a light to the liquid crystal display panel 140, and a light source driving part 143 for controlling the backlight unit 142. The backlight unit 142 is the backlight unit (FIGS. 8-11D) discussed herein according to the various embodiments.

The driving circuit part 141 includes a data driving part 144 for applying a data signal to the data lines DL1~DLn of the liquid crystal display panel 140, a gate driving part 145 for applying gate driving pulses to the gate lines GL1~DLm of the liquid crystal display panel 140, and a timing controller 146 for receiving display data (R, G, B), control signals (DTEN), such as Vsync and Vsync, a clock signal DCLK, and the like from a driving system of the liquid crystal display panel 140, and formatting and forwarding the display data (R, G, B), the clock signals and control signals (DDC, and GDC) according to timings suitable for the data driving part 144 and the gate driving part 145 to reproduce the picture properly.

Since the backlight unit 142 is identical to the backlight unit having the plurality of light guiding plates described above in the first and second embodiments of the present invention, the description of which will be omitted.

The foregoing LCD with the backlight unit is driven under the control of the driving circuit by DDAM.

In the DDAM, the LED lamps 93 are selectively lit by separately applying a voltage to each of the sets of LED lamps 93 respectively facing the first to fourth light guiding plates 91a, 91b, 91c, and 91d, to illuminate a back surface of the liquid crystal display panel in succession as red, green, and blue lights are scattered within the first to fourth light guiding plates 91a, 91b, 91c, and 91d.

Since only the LED lamps 93 facing the light guiding plate to be driven are lit in succession, the picture can be reproduced on the liquid crystal display panel in field sequence.

The successive lighting of only the LED lamp 93 facing the light guiding plate to be driven prevents effectively any leakage of the light to adjacent light guiding plates and the liquid crystal display panel, because the unique characteristics and configurations of the backlight unit of the present invention, such as having separated light guiding plates, mirror-polished divided side surfaces of the light guiding plates, side reflective plates, light spreading means, etc.

In the examples above, there are four light guiding plates 91a-91d per screen and thus four division driving is made. If there are 'n' light guiding plates where n is an integer greater than 1, then 'n' division driving is made.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The backlight unit of the embodiments of the present invention can be used, not only as a light source at a front or rear of various display devices, but also as a light emitting device by itself. Further, the LED lamps 93 can be positioned only at one side of the light guiding plates, instead of at both opposite sides of the light guiding plates.

As has been described, the backlight unit in a display device of the present invention, and a liquid crystal display device therewith have the following advantages.

First, the separate light guiding plates prevent effectively leakage of light to adjacent regions in a DDAM drive, thereby improving the display performance of the display device.

Second, the side reflective plate further provided between the divided light guiding plates permits to prevent leakage of light more effectively.

What is claimed is:

1. A backlight unit suitable for a display device, the backlight unit comprising:
   first to (n)th light guiding plates for field sequential drive, wherein the first to (n)th light guiding plates are formed in parallel, wherein each of the first to (n)th light guiding plates includes a first and a third side in parallel at one direction and a second and a fourth side in parallel at another direction perpendicular to the one direction, wherein each of the first to the (n)th light guiding plates has a mirror-polished surface on at least one of the first and third sides, and wherein the mirror-polished surface is for preventing leakage of light to adjacent light guiding plates that are currently not driven;
   a light source controller disposed at the second and fourth sides of the first to (n)th light guiding plate, wherein the light source controller includes at least one PCB substrate or FPC; and
   a plurality of light sources opposing to the second and fourth sides of the first to (n)th light guiding plates at certain intervals, wherein the light sources are controlled by the light source controller and the light sources are formed on the PCB substrate or FPC.

2. The backlight unit as claimed in claim 1, further comprising:
   at least one reflective plate between two adjacent light guiding plates among the first to (n)th light guiding plates.

3. The backlight unit as claimed in claim 2, further comprising:
   light distributing means for evenly distributing a light from the first to (n)th light guiding plates.

4. The backlight unit as claimed in claim 3, wherein the light distributing means includes at least one diffuser plate or diffuser sheet.

5. The backlight unit as claimed in claim 3, wherein light distributing means is disposed above the first to (n)th light guiding plates.

6. The backlight unit as claimed in claim 2, wherein the at least one reflective plate is a double-sided reflective plate.

7. The backlight unit as claimed in claim 2, wherein the at least one reflective plate includes two one-sided reflective plates.

8. The backlight unit as claimed in claim 1, further comprising:
   light distributing means for evenly distributing a light from the first to (n)th light guiding plates.

9. The backlight unit as claimed in claim 1, further comprising:
   means for changing a refractive index of an area between at least two adjacent light guiding plates among the first to (n)th light guiding plates.

10. The backlight unit as claimed in claim 9, wherein the changing means includes one of the following: a reflective adhesive tape, a reflective plate, and a polished surface.

11. The backlight unit as claimed in claim 1, further comprising:
    light distributing means for evenly distributing a light from the first to (n)th light guiding plates.

12. The backlight unit as claimed in claim 1, wherein each of the light sources includes a light emitting portion and a body portion.

13. The backlight unit as claimed in claim 1, wherein the first to (n)th light guiding plates have a plurality of dot patterns printed on an underside surface thereof.

14. The backlight unit as claimed in claim 1, wherein the light sources include R (Red), G (Green), and B (Blue) LED lamps.

15. A display device comprising:
    a backlight unit including:
    first to (n)th light guiding plates for field sequential drive, wherein the first to (n)th light guiding plates are formed in parallel at one direction, wherein each of the first to (n)th light guiding plates includes a first and a third side in parallel at one direction and a second and a fourth side in parallel at another direction perpendicular to the one direction, wherein each of the first to (n)th light guiding plates has a mirror-polished surface on at least one of the first and third sides, and wherein the mirror-polished surface is for preventing leakage of light to adjacent light guiding plates that are currently not driven;
    a light source controller disposed at the second and fourth sides of the first to (n)th light guiding plate, wherein the light source controller includes at least one PCB substrate or FPC, and
    a plurality of light sources opposing to the second and fourth sides of the first to (n)th light guiding plates at certain intervals, wherein the light sources is controlled by the light source controller and the light sources are formed on the PCB substrate or PPC; and
    a liquid crystal display panel for receiving a light from the backlight unit.

16. The display device as claimed in claim 15, wherein the liquid crystal display panel includes:
    first and second glass substrates bonded together with a gap therebetween, the first and second glass substrates being arranged above the backlight unit, and a liquid crystal layer filled between the first and second glass substrates, wherein the first glass substrate includes a plurality of gate lines arranged in one direction at regular intervals, a plurality of data lines arranged in a direction perpendicular to the gate lines at regular intervals to define pixel regions, a matrix of pixel electrodes in respective pixel regions each defined at a cross of the corresponding gate line and the corresponding data line, and a plurality of thin film transistors at each cross of the gate lines and the data lines, and the second glass substrate includes a black matrix layer for shielding a light incident on regions excluding the pixel regions, and a common electrode on the second glass substrate inclusive of the black matrix layer.

17. The display device as claimed in claim 15, wherein the backlight unit further comprises:

at least one reflective plate between two adjacent light guiding plates among the first to (n)th light guiding plates, wherein the first to (n)th light guiding plates have a plurality of dot patterns printed on an underside surface thereof;

light distributing means for evenly distributing a light from the first to (n)th light guiding plates, wherein the light distributing means includes at least one diffuser plate or diffuser sheet and the light distributing means is disposed above the first to (n)th light guiding plates; and means for changing a refractive index of an area between at least two adjacent light guiding plates among the first to (n)th light guiding plates.

18. The crystal display device as claimed in claim 17, wherein the at least one reflective plate is a double-sided reflective plate.

19. The display device as claimed in claim 17, wherein the changing means includes one of the following: a reflective adhesive tape, a reflective plate, and a polished surface.

* * * * *